(12) United States Patent
Dutta et al.

(10) Patent No.: US 7,120,905 B2
(45) Date of Patent: Oct. 10, 2006

(54) SYSTEM AND METHOD FOR TRANSFORMATION OF ASSEMBLY CODE FOR CONDITIONAL EXECUTION

(75) Inventors: Sandeep Dutta, Foster City, CA (US); Paul Beusterien, Alameda, CA (US); Tomas Evensen, Foster City, CA (US)

(73) Assignee: Wind River Systems, Inc., Alameda, CA (US)

( * ) Notice: Subject to any disclaimer, the term of this patent is extended or adjusted under 35 U.S.C. 154(b) by 595 days.

(21) Appl. No.: 10/354,898

(22) Filed: Jan. 29, 2003

(65) Prior Publication Data

US 2004/0148595 A1 Jul. 29, 2004

(51) Int. Cl.
*G06F 9/45* (2006.01)
(52) U.S. Cl. .................................... 717/156
(58) Field of Classification Search ............... 717/159, 717/158
See application file for complete search history.

(56) References Cited

U.S. PATENT DOCUMENTS 5,452,457 A * 9/1995 Alpert et al. ............... 717/153
5,901,318 A * 5/1999 Hsu .......................... 717/161
6,031,993 A * 2/2000 Andrews et al. ........... 717/143

OTHER PUBLICATIONS

ARM, Ltd., "ARM Architecture Reference Manual," Dave Jagger ed., Prentice Hall, 1996.

* cited by examiner

*Primary Examiner*—John Chavis
(74) *Attorney, Agent, or Firm*—Fay Kaplun & Marcin, LLP.

(57) ABSTRACT

A method and system may be implemented, according to a preferred embodiment of the present invention, to permit transformation of software to use conditional execution instructions. According to the preferred embodiment, a system and method is provided to transform machine instructions (for example, machine instructions generated by a source code compiler) to make use of the conditional execution features of a processor. The preferred embodiment thus reduces code size and better utilizes the instruction pipeline and cache.

19 Claims, 9 Drawing Sheets

| Addr. | Label | Instruction |
|---|---|---|
| | | ... |
| 1000 | foobar: | |
| | | ldr r0,=k |
| | | ldr r2,[r0,#0] |
| | | cmp r2,#0 |
| | | beq .L3 |
| 1010 | | cmp r2,#1 |
| | | beq .L4 |
| 1018 | | cmp r2,#2 |
| | | beq .L5 |
| 1020 | | b .L2 |
| 1024 | .L3: | |
| | | ldr r12,=k |
| | | ldr r12,[r12,#0] |
| | | add r12,r12,#1 |
| | | str r12,[r0,#0] |
| | | b .L2 |
| 1038 | .L4: | |
| | | ldr r12,=i |
| | | ldr r12,[r12,#0] |
| | | add r12,r12,#10 |
| | | str r12,[r0,#4] |
| | | b .L2 |
| 104C | .L5: | |
| | | ldr r12,=j |
| | | ldr r12,[r12,#0] |
| | | add r12,r12,#13 |
| | | str r12,[r0,#8] |
| 105C | .L2: | |
| | | ldr r12,=k |
| | | ldr r12,[r12,#0] |
| | | add r12,r12,#9 |
| | | str r12,[r0,#0] |
| | | mov pc,lr |
| | | ... |

410

130

| BlockID | StartAddr | EndAddr |
|---|---|---|
| ... | ... | ... |
| 22 | 1000 | 100C |
| 23 | 1010 | 1014 |
| 24 | 1018 | 101C |
| 25 | 1020 | 1020 |
| 26 | 1024 | 1034 |
| 27 | 1038 | 1048 |
| 28 | 104C | 1058 |
| 29 | 105C | 106C |
| ... | ... | ... |

| BlockID | DestBlock1 | DestBlock2 | PredBlock |
|---|---|---|---|
| ... | ... | ... | ... |
| 22 | 26 | 23 | -- |
| 23 | 27 | 24 | P1 |
| 24 | 28 | 25 | P2 |
| 25 | 29 | -- | P3 |
| 26 | 29 | -- | P4 |
| 27 | 29 | -- | P5 |
| 28 | 29 | -- | P6 |
| 29 | -- | -- | P7 |
| ... | ... | ... | ... |

PredBlockList:

P1: ... | 22 | 0 | 23 | 0 | 24 | 0 |
P2, P3 (same row)

P4: 22 | 0 | 23 | 0 | 24 | 0 | 25 |
P5, P6, P7

P7: 26 | 27 | 28 | 0 | ...

_US 7,120,905 B2_

SYSTEM AND METHOD FOR TRANSFORMATION OF ASSEMBLY CODE FOR CONDITIONAL EXECUTION

BACKGROUND INFORMATION

One of the issues encountered in computing system design is dealing with computer program branching and its impact on processing speed. Computer programs typically include a number of "branch" instructions which cause program execution to transfer to an alternate area of instructions some distance in memory from the branch instruction. In many cases these branch instructions are "conditional"—they only occur if a particular condition is satisfied (e.g., a specified register or bit has a zero value). Thus it is unknown until the program is executed whether the conditional branch instruction will actually be executed (requiring a jump to the new set of instructions) or not (allowing further execution of the current set of instructions). This uncertainty has implications for processing throughput, as contemporary processors attempt to cache and "pre-process" instructions (as part of an instruction "pipeline") prior to the time for execution, in order to overcome issues such as memory delays and instruction decoding delays. If the conditional branch is taken, the cache and pre-processing may be no longer valid, requiring a pipeline "flush" and reload, and thus creating additional processing delay.

In order to overcome the uncertainties posed by conditional branching in pre-processing, one technique used in contemporary processor designs allows for the conditional execution of instructions, typically through multiple execution pipelines within the processor (and in some cases using branch prediction algorithms to make judgments about likely branch paths). Each pipeline will pre-process a potential conditional branching situation, and the processor will only execute the pipeline that includes the instructions that will actually need to be executed based on the outcome of the conditional branch. Another technique uses "conditional execution" instructions, which are instructions that are only executed when the specified condition is true (the condition is said to "guard" the instruction from execution). Conditional execution instructions can thus be used to reduce the number of branches needed in a section of software. Several processor architectures support conditional execution instructions (e.g., ARM processors, Motorola MCORE processors).

To accommodate conditional execution, software compilers need to be configured to generate machine instructions that take advantage of the efficiencies of conditional execution. Current compilers attempt to perform internal tree optimizations on the processed high-level source code (for example, C or C++ source code). Although tree optimizations can improve execution speed, tree optimizers lack intimate information concerning the block size and number of machine instruction groupings generated by the source code when compiled. Without such information, situations that are appropriate for optimization (and situations that are not appropriate for optimization) can be missed, reducing overall system throughput and memory efficiency.

SUMMARY

According to a preferred embodiment of the present invention, a system is described, comprising a transform block data structure, a control flow data structure and a transform facility. The transform facility is configured to determine a number of transform blocks associated with a number of assembly instructions, and store indications of the number of transform blocks in the transform block data structure, determine a control flow associated with the number of transform blocks and store indications of the control flow in the control flow data structure, determine whether at least one conditional execution optimization should be applied based on at least one of the number of transform blocks and the control flow, and transform at least a portion of the number of assembly instructions into conditional execution instructions when the at least one conditional execution optimization should be applied.

Also according to a preferred embodiment of the present invention, a method is described, comprising determining a number of blocks associated with a number of assembly instructions, and storing indications of the number of blocks in a transform block data structure, determining a control flow associated with the number of blocks, and storing indications of the control flow in the control flow data structure, determining whether at least one conditional execution optimization should be applied based on at least one of the number of blocks and the control flow, and transforming at least a portion of the number of assembly instructions into conditional execution instructions when the at least one conditional execution optimization should be applied.

BRIEF DESCRIPTION OF THE DRAWINGS

FIG. 4 shows an example of transform block identification, according to the present invention.

DETAILED DESCRIPTION

According to a preferred embodiment of the present invention, a method and system may be implemented to permit transformation of software to use conditional execution instructions. According to the preferred embodiment, a system and method is provided to transform machine instructions (also referred to herein as "assembly instructions" or "assembly code") to make use of the conditional execution features of a processor. The preferred embodiment thus reduces code size and better utilizes the instruction pipeline and cache.

The examples provided below illustrate implementation of the preferred embodiment in the context of compiling code for execution on an ARM, Ltd. processor (the "target processor" for compiled code). Compilation for other processors (e.g., Motorola MCORE) that accommodate conditional execution may likewise be implemented. ARM processors are exemplary in that the ARM architecture allows for conditional execution of almost all of the available instruction set (through the use of condition prefixes as part of each machine instruction).

The preferred embodiment achieves several advantages over prior conditional execution optimizers. As an initial matter, the assembly code generation phase of compilation is simplified, in that optimizations are deferred and performed on the generated assembly code. Using actual assembly code (as opposed to source code) allows for more insight into the arrangement of the actual machine instructions when performing transforms for conditional execution. For example, instead of relying on heuristics to determine if a conditional execution transformation would help or hamper the processor pipeline (e.g., the Intel XScale architecture has an instruction pipeline of five, and therefore if a section of code contains more than five instructions it may not be beneficial to transform it to a conditional execution block), by doing the transformation on compiler generated assembly code, the present invention has exact knowledge of the number of instructions in a section of code and the number of branch instructions within a section of code.

The preferred method and system according to the present invention may be implemented in the context of various computing systems, for example, a traditional computer workstation having extensive memory, processing power and input/output (I/O) facilities (displays, keyboards, etc.). The preferred method and system described herein may be implemented as a collection of instructions provided on a computer-readable medium (e.g., CD, DVD, ROM, magnetic disk or other non-volatile storage), executable by a computing system to implement the method and system within the computing system.

Figure 1:
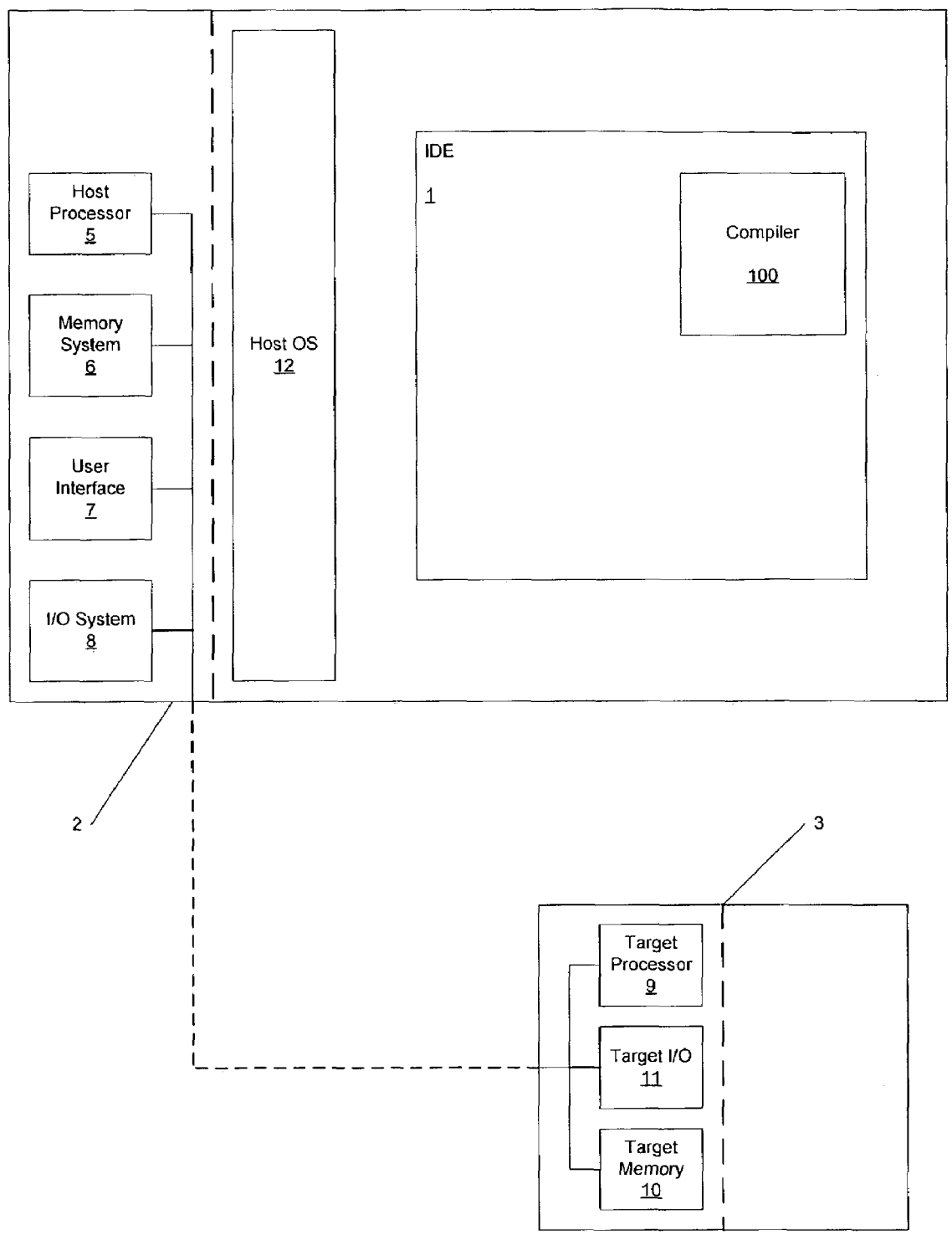
FIG. 1 shows a block diagram of an exemplary operating environment according to the present invention.

FIG. 1 illustrates an operating environment for program development, according to the preferred embodiment of the present invention. An integrated development environment (IDE) 1 is implemented on a host computing system 2. Host computing system 2 may include a host processor 5, host memory system 6, host user interface system 7 and host I/O system 8, as is typical in most workstation environments. Host computing environment 2 may also include a host operating system (OS) 12, which provides a software interface and control framework for interactions between hardware components and IDE 1. In some environments, host computing system 2 may be connected to a target computing system 3 via a communications medium/protocol (e.g., serial link, Ethernet link, debug connection, etc.) through, for example, the host I/O system 8. The target computing system 3 includes a target processor 9, target memory system 10 and target I/O system 11. In other environments, the host computing system may be the target for software being developed (e.g., native development), in which case a separate target system 3 may not be employed (and the host processor is the "target processor" for purposes of development).

As mentioned earlier, in the preferred embodiment, the target processor is an ARM processor, available through a number of sources and licensed by ARM Ltd., Cambridge, United Kingdom. Host computing system 2 may be a workstation-class computing system, such as those based on the Pentium 4 processor (Intel Corp., Santa Clara, Calif.) and executing the Windows XP operating system (Microsoft Corp., Redmond, Wash.). IDE 1 may be the Tornado® IDE available from Wind River Systems, Inc. (Alameda, Calif.). Other host system and target system configurations/equipment may also be used to implement the embodiments described below.

IDE 1 includes a compiler 100, as well as other development tools such as a debugger (not shown). Compiler 100 is designed to translate source code of a specified computing language into code interpretable by the target processor and software loaders to be executed on the target processor (referred to as "object code"). In the preferred embodiment, the compiler 100 is designed to translate source code written in the C or C++ computer languages into ARM processor object code in the ".elf" object code format. The compiler could likewise be configured to use other source code languages and object code formats.

Figure 2:
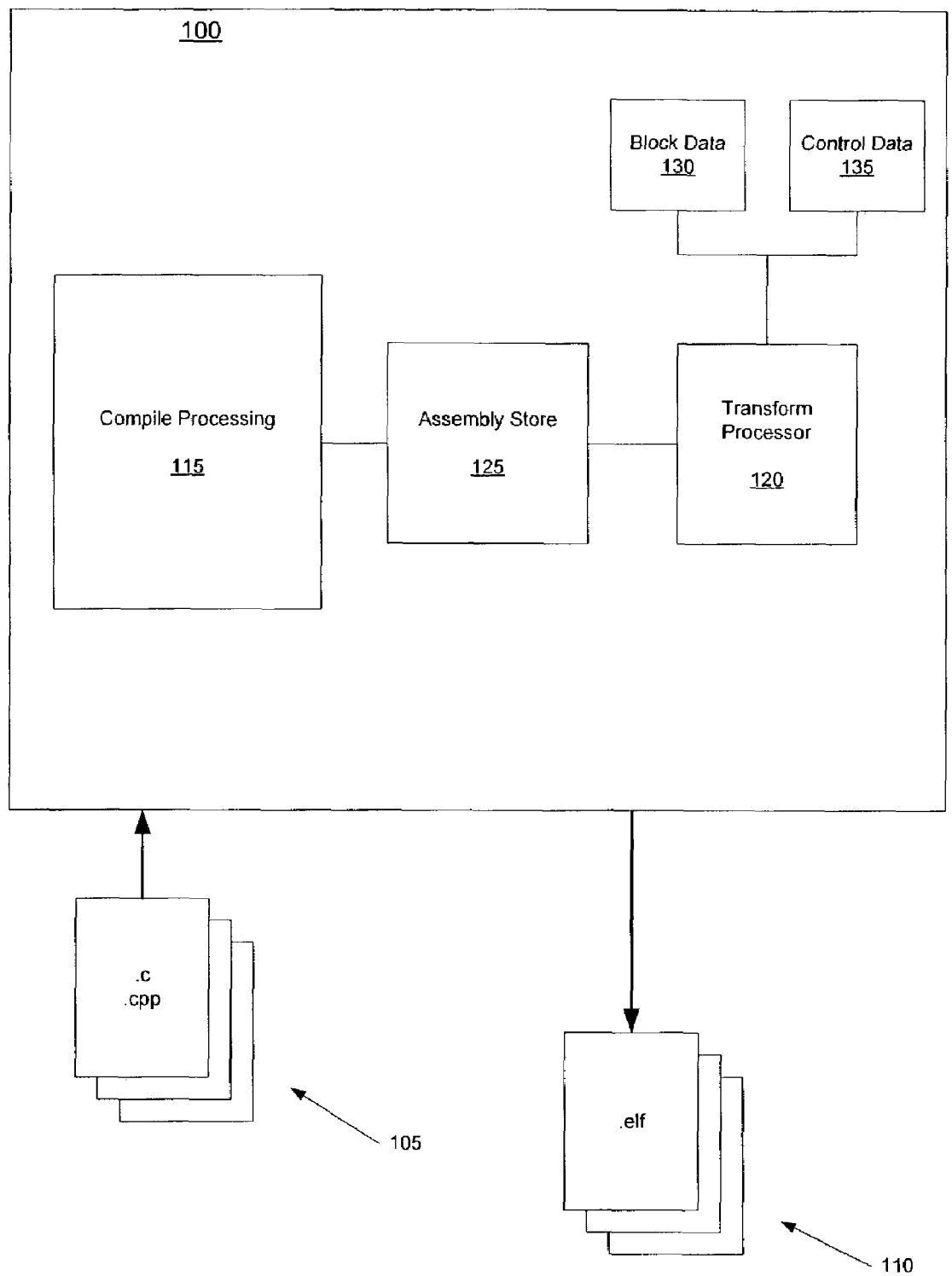
FIG. 2 shows a block diagram of an exemplary compiler according to the present invention.

FIG. 2 illustrates a block diagram of compiler 100. The exemplary compiler 100 includes compiler processing unit 115, which performs basic compiling operations, such as translating source code (such as one or more C/C++ source files 105 identified to compiler 100) into machine instructions supported by the target processor. Compiler 100 may maintain an assembly instruction storage area 125, used as temporary storage for machine instructions produced during compilation activities, which may be later exported and formatted into one or more object code files 110. Exemplary compiler 100 further includes a transform processor facility 120, which (as described below) includes logic to transform assembly instructions to take advantage of conditional execution capabilities of the target processor. Transform processor 120 employs block data structure 130 and control data structure 135 in transform processing, as will be further described below. Compiler 100 may include other processing modules/data structures/storage areas to support compilation activities, although such modules/structures/areas are not depicted in this example as not being necessary to explain the operation of the embodiments of the present invention.

Figure 3:
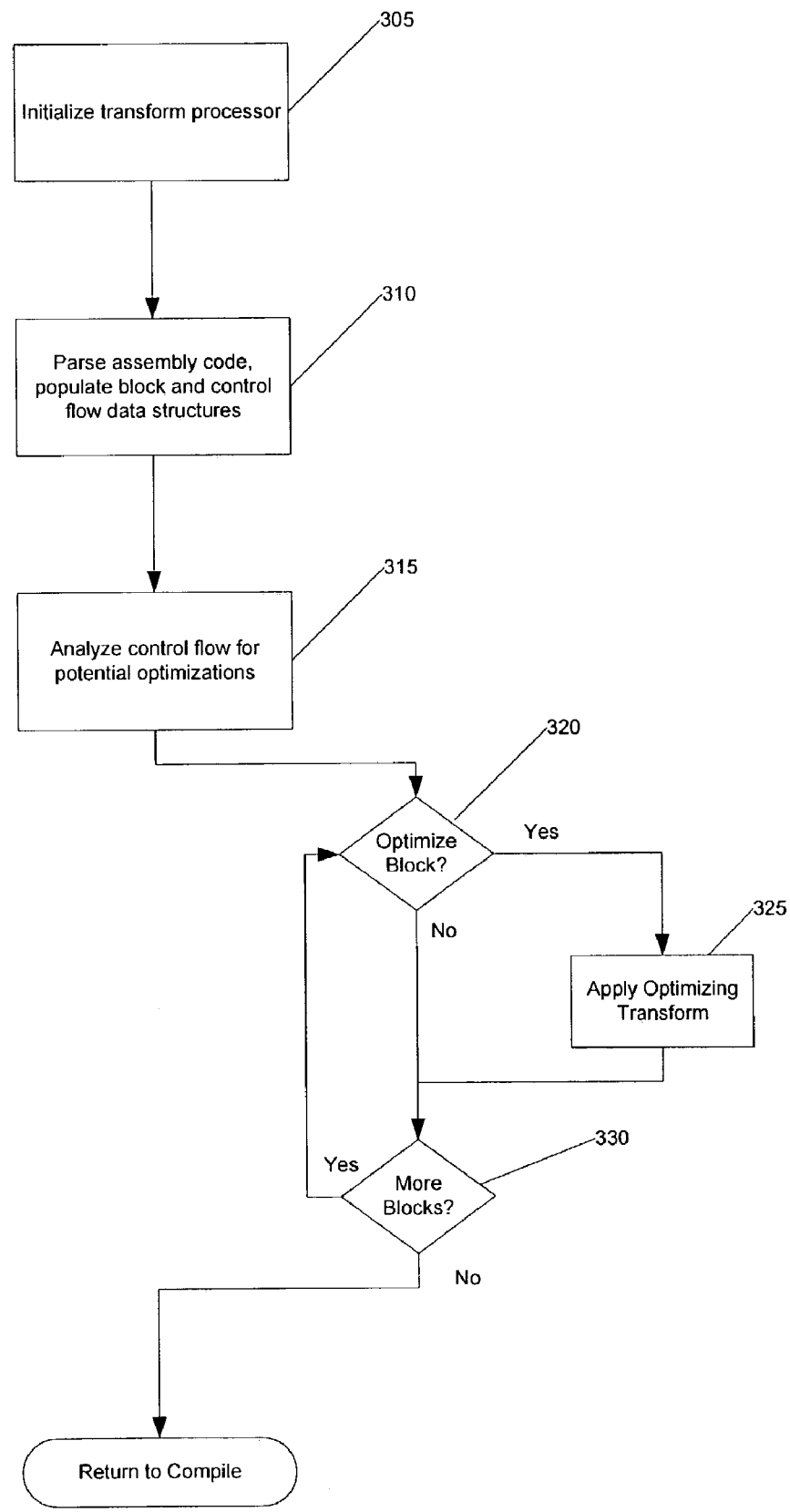
FIG. 3 shows a flow chart of an exemplary logic flow for transform operations according to the present invention.

Transform processor facility 120 includes logic to perform transformations of assembly instructions to take advantage of conditional execution capabilities of the target processor. FIG. 3 is a flow chart illustrating an exemplary logic flow for operations of the transform processor 120. Initially, the transform processor is initialized with certain characteristics of the target processor, for example, the depth of the execution pipeline supported by the target processor, and the assembly instructions that support conditional execution (step 305). The assembly instructions resulting from compilation (in this embodiment, stored in the assembly store 125) are then parsed to divide the assembly code into "transform blocks" and populate the block data structure 130 and control flow data structure 135 (step 310). A transform block (also referred to herein simply as a block) is a section of sequential assembly code that ends on either a branch instruction or the instruction immediately prior to an assembly code label, i.e., a set of instructions that are executed sequentially without any intervening branches or entry points. Transform blocks can be mapped to show their associations with each other, i.e., which blocks are "destination" blocks (to which execution will transfer after execution of the branch instruction), and which blocks are "predecessor" blocks (from which execution was transferred prior to execution of the current block). This mapping is referred to as "control flow."

FIG. 4 illustrates an example of transform block identification. As shown, assembly instructions 410 can be parsed to identify blocks (shown in FIG. 4 with dashed lines). The block data structure 130, is populated with entries corresponding to each block. The exemplary block data structure 130 as shown in FIG. 4 includes an entry for each identified block, including a block ID field, a start address for the block, and an end address for the block. The block size may be included rather than (or in addition to) the block end address in the block entry. The control data structure 135 is also populated with an entry for each identified block. The exemplary control data structure 135 as shown in FIG. 4 includes an entry for each identified block, including a block ID field, two destination block fields (the second destination field used for conditional branch destinations), and a predecessor block list field. The predecessor block list field may take the form of a pointer to a list of blocks which are predecessors to the block corresponding to the entry. Alternate arrangements for the block data structure and control flow data structure are possible while achieving similar information storage, e.g., the block data structure and control flow data structures may be combined into a single block data structure containing all of the information provided by the two preferred data structures.

Once the block and control flow data structures have been populated through the parsing process, the transform processor may analyze the control flow to determine if any patterns exist in the assembly code that may warrant optimization using conditional execution instructions (step 315). This analysis may be done, for example, by traversing the control flow data structure and comparing each block to a number of conditions which, if present, indicate that an optimization is available (step 320). These conditions may be "hard-coded" into the transform processor 120, or may be made available to the transform processor from an external source, such as a data file. Examples of conditions will be discussed below. Where an optimization is available, the transform processor applies the optimization to the block(s) involved (step 325) by transforming the assembly instructions associated with the block(s) using conditional execution instructions, storing the new code in the assembly store 125, and modifying the block and control flow data structures. The process continues processing the next block until all blocks have been processed (step 330).

Once all blocks have been processed for condition execution transformation, the compiler 100 may generate the one or more object code files 110 corresponding to the original source code files 105.

The following examples illustrate several of the control flow patterns that yield more efficient transformations in conditional execution form. In the first example, the source code (illustrated in Table 1 in C source form) implements a common "switch" construct within a function named "foobar".

TABLE 1

C Source Code, Example 1

```
int k,i,j;
...
void foobar( )
{
    switch (k) {
    case 0:
        k += 1;
        break;
    case 1:
        i += 10;
        break;
    case 2:
        j += 13;
        break;
    }
    k += 9;
    return;
}
```

Table 2 illustrates the assembly instructions generated by compiler 100 prior to conditional execution processing (with comments inserted to aid in tracking the original source code).

TABLE 2

Assembly Instructions before Conditional Execution Processing, Example 1

```
foobar:
        ldr     r0,=k
//      switch (k) {
        ldr     r2,[r0,#0]
        cmp     r2,#0
        beq     .L3
        cmp     r2,#1
        beq     .L4
        cmp     r2,#2
        beq     .L5
        b       .L2
.L3:
//          case 0:
//              k += 1;
        ldr     r12,=k
        ldr     r12,[r12,#0]
        add     r12,r12,#1
        str     r12,[r0,#0]
        b       .L2
.L4:
//              break;
//          case 1:
//              i += 10;
        ldr     r12,=i
        ldr     r12,[r12,#0]
        add     r12,r12,#10
        str     r12,[r0,#4]
        b       .L2
.L5:
//              break;
//          case 2:
//              j += 13;
        ldr     r12,=j
        ldr     r12,[r12,#0]
        add     r12,r12,#13
        str     r12,[r0,#8]
.L2:
//              break;
//      }
//      k += 9;
        ldr     r12,=k
        ldr     r12,[r12,#0]
        add     r12,r12,#9
        str     r12,[r0,#0]
//      return;
// }
        mov     pc,lr
```

Note that this first example generates assembly code that, when parsed to identify transform blocks, generates a number of blocks that end in a conditional branch, where the destination block of the conditional branch ends in an unconditional branch. This pattern is frequently generated in compilation of "switch" statements. The size of this example code is 28 instructions (totaling 112 bytes), and includes six branch instructions (not including the final function return instruction "mov pc,lr").

Applying the process as outlined above (and in reference to FIG. 3), the assembly instructions of Table 2 are parsed by the transform processor 120 to determine the transform blocks within the assembly instructions. In this example, eight blocks are identified (as is illustrated in the block data structure 130 shown in FIG. 4). Control flow for this first example is also shown in FIG. 4 within the control flow data structure 135.

Figure 5:
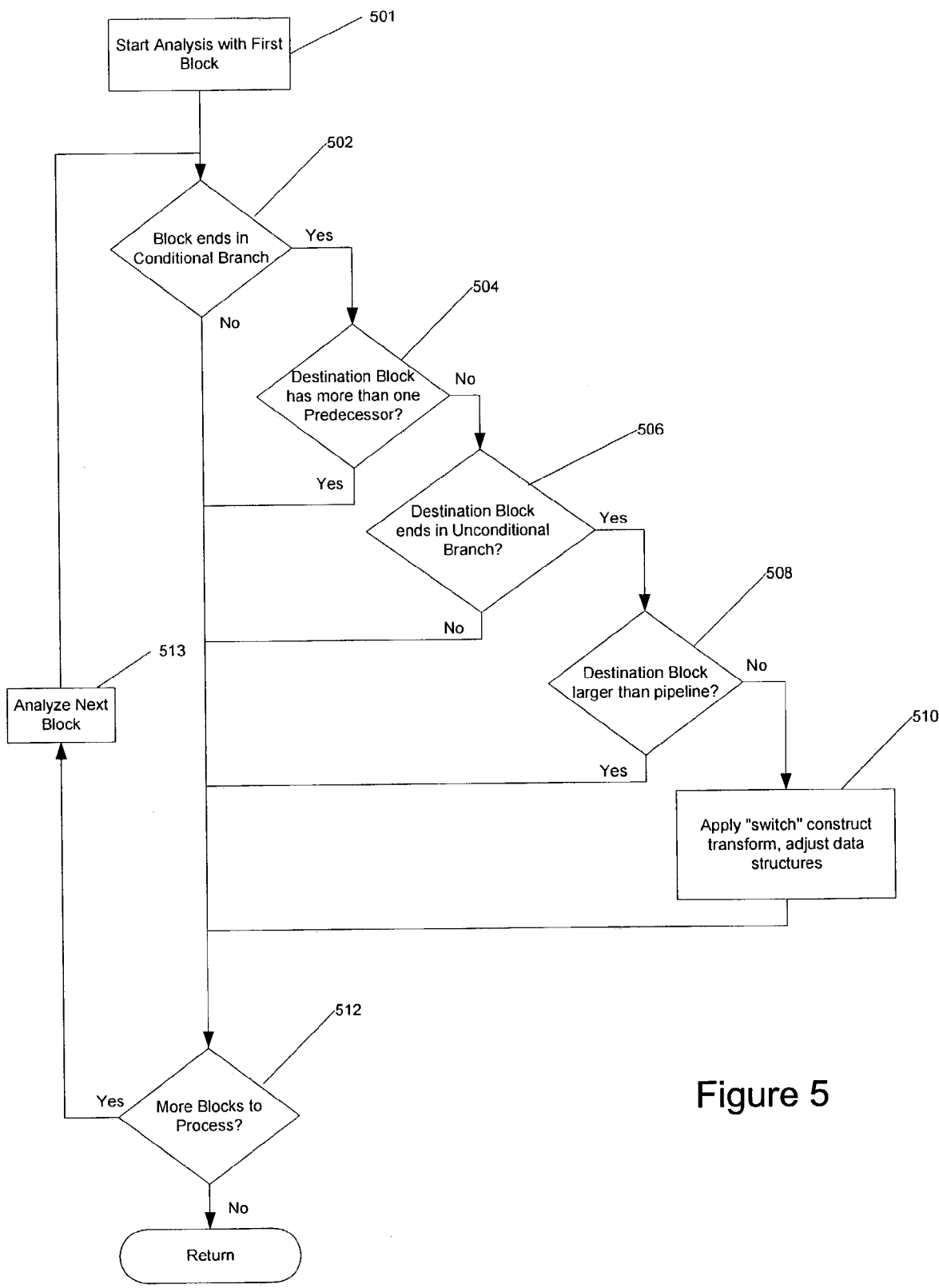
FIG. 5 shows a flow chart of an analysis according to a first example of transformation to determine if a transform block is optimizable, according to the present invention.

Each block in the "foobar" function is then analyzed to determine if any of the blocks are optimizable. The particular conditions which each block will be tested against are shown in the flow chart of FIG. 5. Starting (step 501) with the first block (the entry point of the function), it is determined whether the block ends in a conditional branch instruction (step 502), which can be done by examining the instruction at the end address of the block. If this end instruction is not a conditional branch, the optimization does not apply, and the transform moves to process the next block. If the block does end with a conditional branch, the destination block of the conditional branch is the examined (which can be identified, for example, by reading the contents of the second destination block field of the entry in the control flow data structure 135). If this destination block is the destination block for more than just this block (step 504), which can be determined by examining the predecessor block list within the control flow data structure, then the optimization does not apply, and the transform moves to process the next block. If the destination block does not itself end in an unconditional branch (step 506), the optimization does not apply, and the transform moves to process the next block. If the destination block contains more instructions than are supported by the instruction pipeline of the target processor (step 508), the optimization does not apply, and the process moves to process the next block.

For those blocks which satisfy each of the prior conditions, the block may be transformed to use conditional execution instructions (step 510). The transformation is to convert each instruction in the destination block to a conditional execution instruction guarded by the same condition applicable to the conditional branch of the original block, to then merge the destination block into the original block, and then delete the conditional branch instruction of the original block. The block data structure 130 and the control flow data structure 135 are modified accordingly. After the transform is applied, processing passes to the next block still identified in the block data structure for the assembly instructions (step 513), until all blocks identified in the block data structure have been processed (step 512).

Applying this transform to the assembly instructions originally generated by the compiler 100 for this first example (see Table 2), the assembly instructions of Table 3 are the result. Block 26 has been merged into block 22 and block 27 has been merged into block 23. In each case, conditional execution instructions have been used that are guarded using the same condition ("eq") as the condition applicable to the prior branch ("beq"), which has now been deleted.

TABLE 3

Assembly Instructions with Conditional Execution Optimizations, Example 1

| foobar: | | | COMMENTS: |
|---|---|---|---|
| | ldr | r0,=k | block 22 start |
| // | switch (k) { | | |
| | ldr | r2,[r0,#0] | |
| | cmp | r2,#0 | |
| | ldreq | r12,=k | block 26 merged into block 22, |
| | ldreq | r12,[r12,#0] | instructions guarded using 'eq' |
| | addeq | r12,r12,#1 | condition, 'beq' instruction |
| | streq | r12,[r0,#0] | deleted |
| | beq | .L2 | |
| | cmp | r2,#1 | block 23 start |
| | ldreq | r12,=i | block 27 merged into block 23, |
| | ldreq | r12,[r12,#0] | instructions guarded using 'eq' |
| | addeq | r12,r12,#10 | condition, 'beq' instruction |
| | streq | r12,[r0,#4] | deleted |
| | beq | .L2 | |
| | cmp | r2,#2 | block 24 start (no transform) |
| | beq | .L5 | |
| | b | .L2 | block 25 start (no transform) |

TABLE 3-continued

Assembly Instructions with Conditional Execution Optimizations, Example 1

| .L3: | | | |
|---|---|---|---|
| // | case 0: | | source code for blocks 26 and |
| // | k += 1; | | 27 now merged into blocks 22 |
| .L4: | | | and 23 (respectively) for |
| // | break; | | conditional execution |
| // | case 1: | | |
| // | i += 10; | | |
| .L5: | | | block 28 start (no transform) |
| // | break; | | |
| // | case 2: | | |
| // | j += 13; | | |
| | ldr | r12,=j | |
| | ldr | r12,[r12,#0] | |
| | add | r12,r12,#13 | |
| | str | r12,[r0,#8] | |
| .L2: | | | block 29 start (no transform) |
| // | break; | | |
| // | } | | |
| // | k += 9; | | |
| | ldr | r12,=k | |
| | ldr | r12,[r12,#0] | |
| | add | r12,r12,#9 | |
| | str | r12,[r0,#0] | |
| // | return; | | |
| // | } | | |
| | mov | pc,lr | |

The code generated for the "foobar" function through the transform uses 26 instructions (104 bytes) which is actually two instructions (eight bytes) smaller than the originally generated assembly instructions, with a shorter execution path (and therefore a faster execution time). Furthermore, by merging certain of the blocks, the number of branches is reduced by two, which provides further opportunities for instruction scheduling. For example, a scheduling optimization algorithm can be applied to the transformed code to determine the cycle times of each instruction and reorder the instructions to optimize for instructions that require additional clock cycles.

As a second example, source code which implements an "if-true" construct are also typically able to be transformed into conditional execution instructions that optimize execution. These constructs typically generate assembly instruction blocks that end with an unconditional branch, with destination blocks which also end with an unconditional branch to the same address as the original block. Table 4 shows a C source code listing for this second example, and Table 5 shows an assembly instruction listing of the compiler output (prior to conditional execution processing) for the source code of Table 4.

TABLE 4

C Source Code, Example 2 int i,j,k;
...
foobar( )
{
    if (i < 10)
        j += i;
}

TABLE 5

Assembly Instructions Prior to Conditional Execution Processing, Example 2

| foobar: | | | COMMENTS: |
|---|---|---|---|
| | ldr | r1,=i | block 31 start |
| | ldr | r0,[r1,#0] | |
| // | if (i < 10) | | |
| | cmp | r0,#10 | |
| | bge | .L2 | block 31 end |
| // | j += i; | | |
| | ldr | r12,[r1,#4] | block 32 start |
| | add | r12,r12,r0 | |
| | str | r12,[r1,#4] | block 32 end |
| // } | | | |
| .L2: | | | block 33 start |
| | mov | pc,lr | block 33 end |

Figure 6:
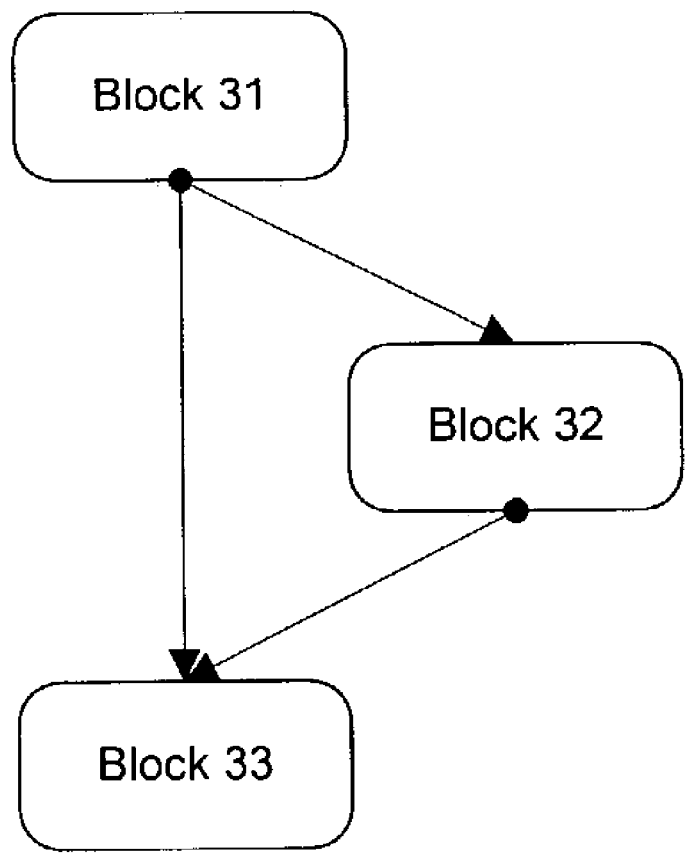
FIG. 6 shows an illustration of block control flow for a second example of transformation, according to the present invention.

Applying the process as outlined above (and in reference to FIG. 3), the assembly instructions of Table 5 are parsed by the transform processor to determine the transform blocks within the assembly instructions. In this example, three blocks are identified (blocks 31, 32 and 33 as noted in Table 5), and the control flow for this second example is shown in FIG. 6.

Figure 7:
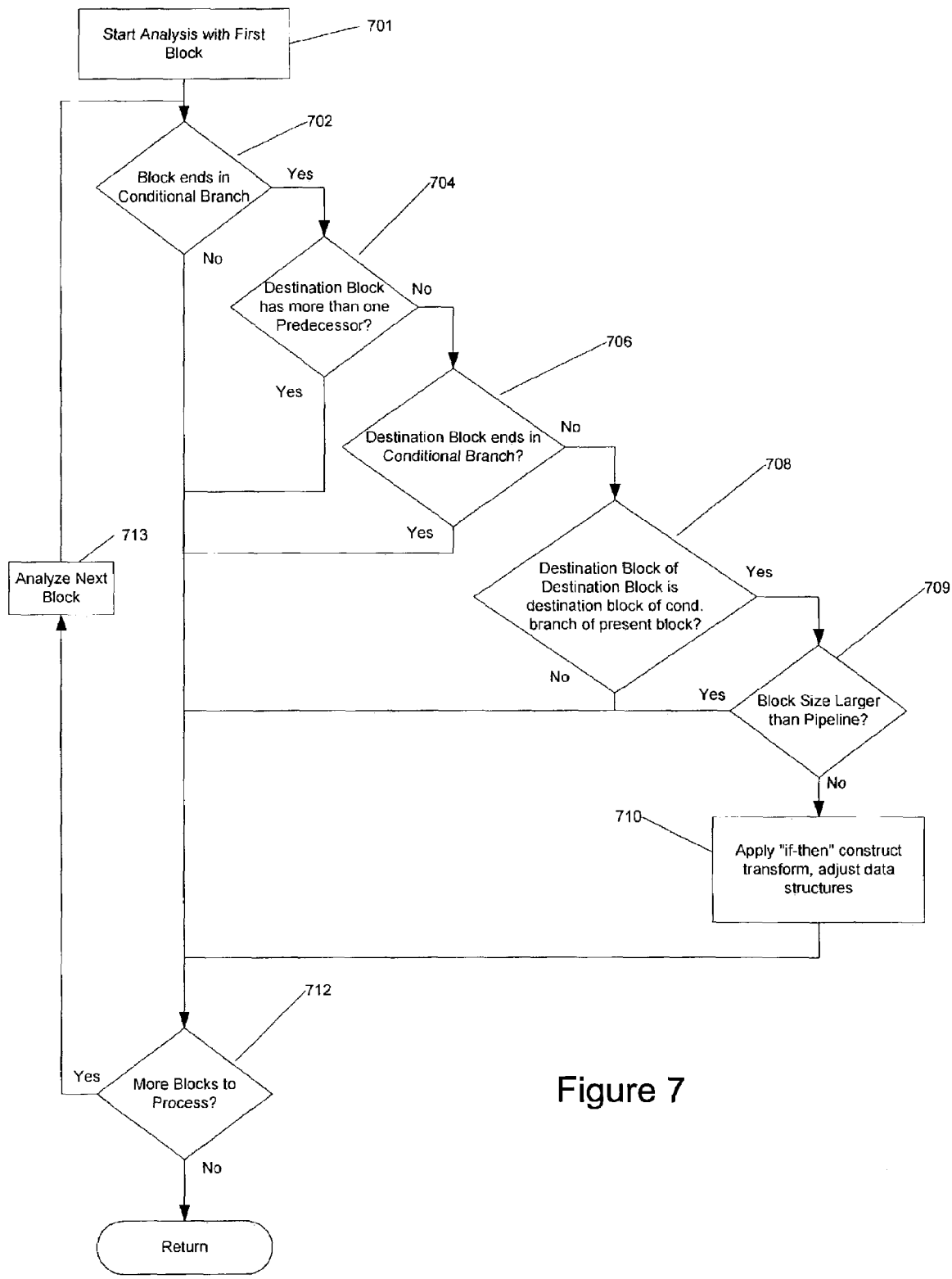
FIG. 7 shows a flow chart of an analysis according to the second example of transformation to determine if a transform block is optimizable, according to the present invention.

Each block in the function is then analyzed to determine if any of the blocks are optimizable. The particular conditions which each block will be tested against are shown in the flow chart of FIG. 7. Starting with the first block (step 701), it is determined whether the block ends in a conditional branch instruction (step 702). If not, the optimization does not apply, and the transform moves to process the next block. If the block ends with a conditional branch, the destination blocks of the block are examined. If the first destination block (i.e., the destination block to which flow will transfer if the conditional branch is not taken) is the destination block for more than just this block, i.e., it has more than one predecessor block (step 704), then the optimization does not apply, and the transform moves to process the next block. If the first destination block itself ends in a conditional branch (step 706), the optimization does not apply, and the transform moves to process the next block. If the destination block of the first destination block is not the second destination block of the present block (i.e., the destination block to which flow will transfer if the conditional branch of the present block is taken), the optimization does not apply, and the transform moves to process the next block (step 708). If the block size is greater than the pipeline size (step 709), the optimization does not apply, and the transform moves to process the next block.

For those blocks which satisfy each of the prior conditions, the block may be transformed to use conditional execution instructions (step 710). The transformation is to convert each instruction in the first destination block that satisfied the above conditions to a conditional execution instruction guarded by the reverse condition applicable to the conditional branch of the original block, to merge the first destination block into the original block, and then delete the conditional branch instruction of the original block. The block data structure 130 and the control flow data structure 135 are modified accordingly. After the transform is applied, processing passes to the next block still identified in the block data structure for the assembly instructions (step 713), until all blocks identified in the block data structure have been processed (step 712).

Applying this transform to the assembly instructions originally generated by the compiler 100 for this second example (see Table 5), the assembly instructions of Table 6 are the result. Block 32 has been merged into block 31, and conditional execution instructions have been used that are guarded using the opposite condition ("lt") as the condition applicable to the prior branch ("bge"), which has now been deleted.

TABLE 6

Assembly Instructions After Conditional Execution Transform, Example 6

| foobar: | | | COMMENTS: |
|---|---|---|---|
| .L2: | | | block 31 start |
| | ldr | r1,=i | |
| | ldr | r0,[r1,#0] | |
| // | if (i < 10) | | |
| | cmp | r0,#10 | |
| // | j += i; | | block 32 merged with block 31: |
| | ldrlt | r12,[r1,#4] | instructions guarded with 'lt' |
| | addlt | r12,r12,r0 | condition (opposite of 'ge'), |
| | strlt | r12,[r1,#4] | 'bge' instruction deleted |
| // } | | | |
| | mov | pc,lr | block 33 start/end |

The transformed code of the second example yields a one instruction (four byte) savings over the unoptimized code, with no branches.

A third example of a code construct that may be optimized through conditional execution transformation is the "if-then-else" construct, such as the one illustrated in C source code form in Table 7, and resulting compiled assembly code form in Table 8.

TABLE 7

C source code, Example 3

```
int i,j,k;
...
foobar( )
{
    if (i < 10)
        j += i;
    else
        k += j;
}
```

TABLE 8

Assembly Instructions prior to Conditional Execution Transform, Example 3

| foobar: | | | COMMENTS: |
|---|---|---|---|
| | ldr | r1,=j | block 41 |
| | ldr | r0,[r1,#4] | |
| // | if (i < 10) | | |
| | cmp | r0,#10 | |
| | bge | .L2 | |
| // | j += i; | | |
| | ldr | r12,[r1,#0] | block 42 |
| | add | r12,r12,r0 | |
| | str | r12,[r1,#0] | |
| | b | .L3 | |
| .L2: | | | block 43 |
| // | else | | |
| // | k += j; | | |
| | ldr | r12,[r1,#8] | |
| | ldr | r3,[r1,#0] | |
| | add | r12,r12,r3 | |
| | str | r12,[r1,#8] | |
| .L3: | | | block 44 |
| // } | | | |
| | mov | pc,lr | |

Figure 8:
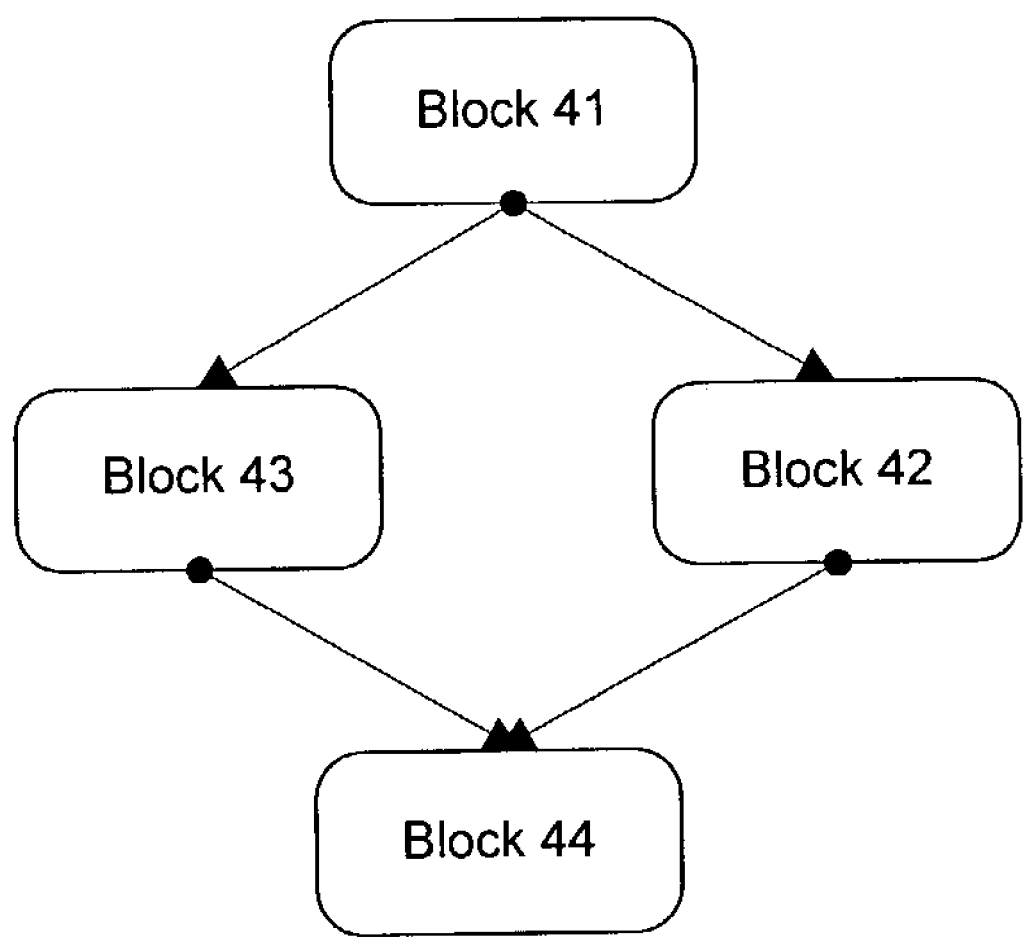
FIG. 8 shows an illustration of block control flow for a third example of transformation, according to the present invention.

Applying the process as outlined above (and in reference to FIG. 3), the assembly instructions of Table 8 are parsed by the transform processor to determine the transform blocks within the assembly instructions. In this example, four blocks are identified (blocks 41, 42, 43 and 44 as noted in Table 8), and the control flow for this second example is shown in FIG. 8.

Figure 9:
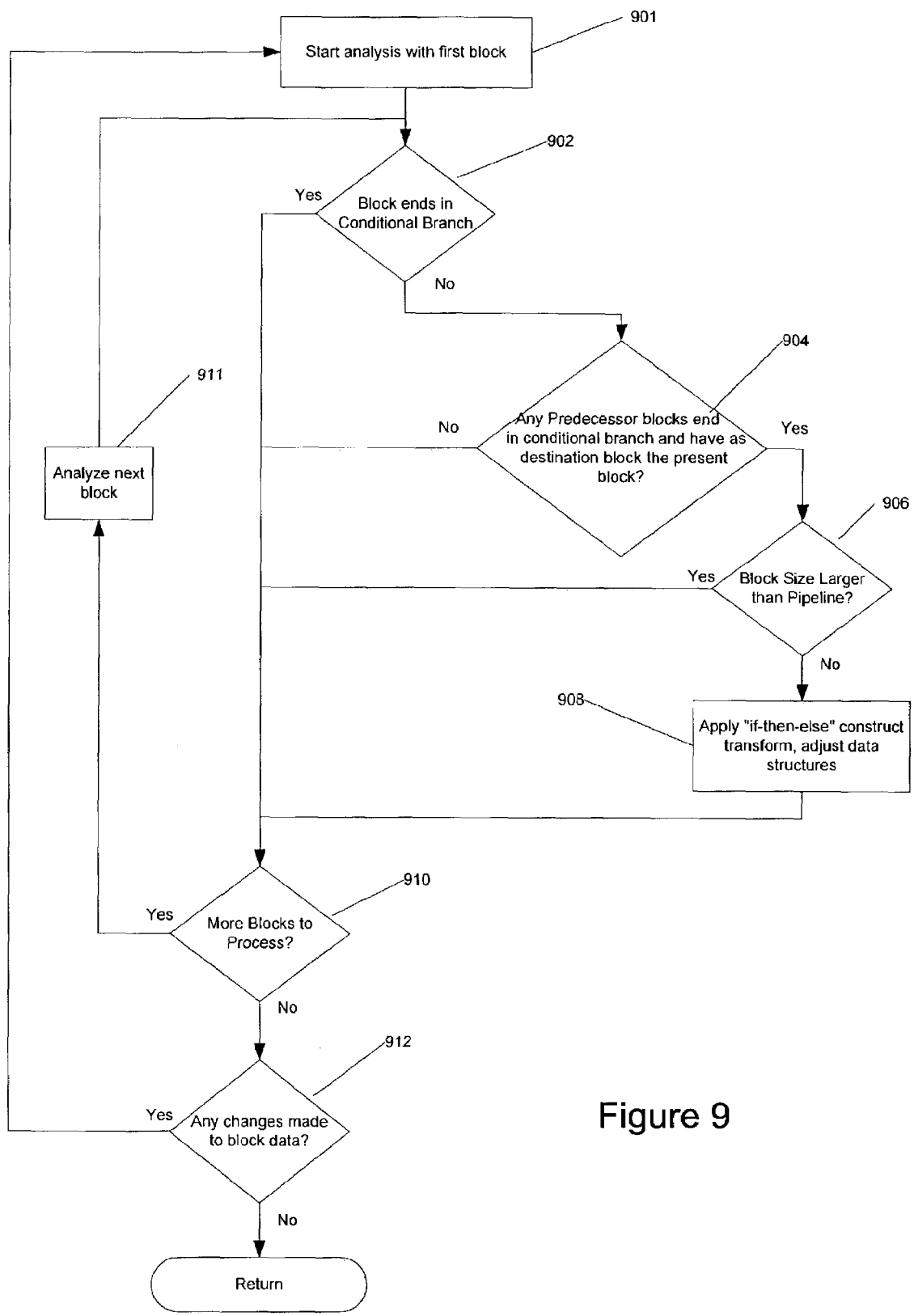
FIG. 9 shows a flow chart of an analysis according to the third example of transformation to determine if a transform block is optimizable, according to the present invention.

Each block in the function is then analyzed to determine if any of the blocks are optimizable. The particular conditions which each block will be tested against are shown in the flow chart of FIG. 9. Starting with the first block (step 901), it is determined whether the block ends in a conditional branch instruction (step 902). If so, the optimization does not apply, and the transform moves to process the next block. Otherwise, the predecessor blocks of the present block are examined. If any of the immediate predecessor blocks to the present block end in a conditional branch instruction and have as a first destination block the present block (step 904), then the optimization may apply. Otherwise, the optimization does not apply to the present block, and processing proceeds to the next block. If the present block size is larger than the pipeline size (step 906), then the optimization does not apply, and processing proceeds to the next block.

The present block may now be transformed to use conditional execution instructions. The transformation is to convert each instruction in the present block to a conditional execution instruction guarded by the reverse condition applicable to the conditional branch of the predecessor block, to merge the present block into the predecessor block, and then delete the conditional branch instruction of the predecessor block (step 908). The block data structure 130 and the control flow data structure 135 are modified accordingly. The condition testing is performed again for each block (step 911), and the transform applied accordingly, until all blocks identified in the block data structure have been processed (step 910).

Additionally illustrated in this example, the transform may be applied multiple times, in order to catch further opportunities for optimizations that may be created as a result of transformations, but are missed due to the flow of condition testing. As a result, after all blocks have been processed, it is determined whether any changes have been made to the block control flow (step 912). This can be done, for example, by keeping a dedicated indicator for changes to the block data structure, which is set when any change is made to the block data structure or control flow data structure (other means of change detection can also be used). If no changes have been made to any of the blocks, there is no need to do further processing. If changes have been made, then the process may restart at the first block to perform further optimizations (and the indicator, in this example, may be reset).

Applying this transform to the assembly instructions originally generated by the compiler 100 for this third example (see Table 8), the assembly instructions of Tables 9 and 10 are the result. As shown in Table 9, block 42 has been merged into block 41, and conditional execution instructions have been used that are guarded using the opposite condition ("lt") as the condition applicable to the prior branch ("bge"), which has now been deleted.

TABLE 9

Post-Transform Assembly Instructions (First Block Merge), Example 3

| foobar: | | | COMMENTS: |
|---|---|---|---|
| | ldr | r1,=j | block 41 |
| | ldr | r0,[r1,#4] | |
| // | if (i < 10) | | |
| | cmp | r0,#10 | |
| // | j += i; | | |
| | ldrlt | r12,[r1,#0] | block 42 merged with block 41: |
| | addlt | r12,r12,r0 | instructions guarded with |
| | strlt | r12,[r1,#0] | opposite of conditional branch |
| | blt | .L3 | ('lt'), 'bge' deleted |
| .L2: | | | block 43 |
| // | else | | |
| // | k += j; | | |
| | ldr | r12,[r1,#8] | |
| | ldr | r3,[r1,#0] | |
| | add | r12,r12,r3 | |
| | str | r12,[r1,#8] | |
| .L3: | | | block 44 |
| // } | | | |
| | mov | pc,lr | |

Likewise, as shown in Table 10, after block 42 has been processed, block 43 has been identified as optimizable (since block 41 post-transform now ends with a conditional branch and has as a destination block block 43) and has been merged into block 41, with the instructions in block 43 converted to conditional execution instructions guarded by the opposite condition ("ge") as in the conditional branch of block 41 ("blt"), which is now deleted.

TABLE 10

Post-Transform Assembly Instructions (Second Block Merge), Example 3

| foobar: | | | COMMENTS: |
|---|---|---|---|
| .L2: | | | |
| .L3: | | | block 41 |
| | ldr | r1,=j | |
| | ldr | r0,[r1,#4] | |
| // | if (i < 10) | | |
| | cmp | r0,#10 | |
| // | j += i; | | |
| | ldrlt | r12,[r1,#0] | portion merged from block 42 |
| | addlt | r12,r12,r0 | |
| | strlt | r12,[r1,#0] | |
| // | else | | |
| // | k += j; | | |
| | ldrge | r12,[r1,#8] | block 43 merged into block 41: |
| | ldrge | r3,[r1,#0] | instructions guarded with |
| | addge | r12,r12,r3 | opposite condition ('ge'), |
| | strge | r12,[r1,#8] | 'blt' instruction deleted. |
| // } | | | |
| | mov | pc,lr | block 44 |

The conditional execution code has reduced the size of the resulting code by two instructions (eight bytes), shortened the execution path and therefore increased the execution speed of the "foobar" function. Note also that the entire "if-then-else" construct has now been transformed into a linear code sequence (i.e., no branches) which makes instruction scheduling much more flexible.

The three examples of optimizations described above are exemplary, as other optimizations may also be possible. Furthermore, the optimization condition comparisons can be combined as part of a single processing of the block data, so as to determine simultaneously whether any of the optimization examples might apply to any particular block.

In the preceding specification, the invention has been described with reference to specific exemplary embodiments thereof. It will, however, be evident that various modifications and changes may be made thereunto without departing from the broader spirit and scope of the invention as set forth in the claims that follow. The specification and drawings are accordingly to be regarded in an illustrative rather than restrictive sense.

What is claimed is:

1. A system comprising:
   a transform block data structure;
   a control flow data structure; and
   a transform facility configured to
   (a) determine a number of transform blocks associated with a number of assembly instructions, and store indications of the number of transform blocks in the transform block data structure,
   (b) determine a control flow associated with the number of transform blocks and store indications of the control flow in the control flow data structure,
   (c) determine whether at least one conditional execution optimization should be applied based on at least one of the number of transform blocks and the control flow, the determining including determining whether a present block
      ends with a conditional branch instruction,
      has a destination block of the conditional branch instruction that does not have more than one predecessor block and ends with an unconditional branch, and
      has a size that is less than a pipeline size of a target processor for the assembly instructions,
      in which case the at least one conditional execution optimization should be applied;
   (d) transform at least a portion of the number of assembly instructions into conditional execution instructions when the at least one conditional execution optimization should be applied.

2. The system of claim 1, further comprising:
   a compiler processing facility, configured to generate the number of assembly instructions based on a number of source code instructions.

3. The system of claim 1, wherein the transform block data structure and the control flow data structure are part of a single block data structure.

4. A system comprising:
   a transform block data structure;
   a control flow data structure; and
   a transform facility configured to
   (a) determine a number of transform blocks associated with a number of assembly instructions, and store indications of the number of transform blocks in the transform block data structure,
   (b) determine a control flow associated with the number of transform blocks and store indications of the control flow in the control flow data structure,
   (c) determine whether at least one conditional execution optimization should be applied based on at least one of the number of transform blocks and the control flow, the determining including determining whether a present block
      ends with a conditional branch instruction,
      has a destination block not of the conditional branch instruction that does not have more than one predecessor block, does not end with a conditional branch, and has as its own destination block a destination block of the conditional branch instruction, and
      has a size that is less than a pipeline size of a target processor for the assembly instructions,
      in which case the at least one conditional execution optimization should be applied;
   (d) transform at least a portion of the number of assembly instructions into conditional execution instructions when the at least one conditional execution optimization should be applied.

5. A system comprising:
   a transform block data structure;
   a control flow data structure; and
   a transform facility configured to
   (a) determine a number of transform blocks associated with a number of assembly instructions, and store indications of the number of transform blocks in the transform block data structure,
   (b) determine a control flow associated with the number of transform blocks and store indications of the control flow in the control flow data structure,
   (c) determine whether at least one conditional execution optimization should be applied based on at least one of the number of transform blocks and the control flow, the determining including determining whether a present block
      does not end with a conditional branch instruction,
      has a predecessor block that ends in a conditional branch instruction and has as a destination block the present block, and
      has a size that is less than a pipeline size of a target processor for the assembly instructions,
      in which case the at least one conditional execution optimization should be applied,
   (d) transform at least a portion of the number of assembly instructions into conditional execution instructions when the at least one conditional execution optimization should be applied.

6. The system of claim 1, wherein the transform facility is further configured to
   (e) re-determine whether the at least one conditional execution optimization should be applied based on at least one of the number of transform blocks and the control flow, when at least one of the transform block data structure and control flow data structure are changed after (c) and (d) have been applied to all of the number of transform blocks,
   (f) transform at least a portion of the number of assembly instructions into conditional execution instructions when the at least one conditional execution optimization should be applied based on the re-determination.

7. A method, comprising:
   (a) determining a number of blocks associated with a number of assembly instructions, and storing indications of the number of blocks in a transform block data structure;
   (b) determining a control flow associated with the number of blocks, and storing indications of the control flow in the control flow data structure;
   (c) determining whether at least one conditional execution optimization should be applied based on at least one of the number of blocks and the control flow that includes determining whether a present block ends with a conditional branch instruction,
has a destination block of the conditional branch instruction that does not have more than one predecessor block and ends with an unconditional branch, and
has a size that is less than a pipeline size of a target processor for the assembly instructions; and
(d) transforming at least a portion of the number of assembly instructions into conditional execution instructions when the at least one conditional execution optimization should be applied.

8. The method of claim 7, further comprising:
compiling a number of source code instructions to generate the number of assembly instructions.

9. The method of claim 7, wherein the transform block data structure and the control flow data structure are part of a single block data structure.

10. A method, comprising:
(a) determining a number of blocks associated with a number of assembly instructions, and storing indications of the number of blocks in a transform block data structure;
(b) determining a control flow associated with the number of blocks, and storing indications of the control flow in the control flow data structure;
(c) determining whether at least one conditional execution optimization should be applied based on at least one of the number of blocks and the control flow that includes determining whether a present block
ends with a conditional branch instruction,
has a destination block not of the conditional branch instruction that does not have more than one predecessor block, does not end with a conditional branch, and has as its own destination block a destination block of the conditional branch instruction, and
has a size that is less than a pipeline size of a target processor for
the assembly instructions; and
(d) transforming at least a portion of the number of assembly instructions into conditional execution instructions when the at least one conditional execution optimization should be applied.

11. A method, comprising:
(a) determining a number of blocks associated with a number of assembly instructions, and storing indications of the number of blocks in a transform block data structure;
(b) determining a control flow associated with the number of blocks, and storing indications of the control flow in the control flow data structure;
(c) determining whether at least one conditional execution optimization should be applied based on at least one of the number of blocks and the control flow that includes determining whether a present block
does not end with a conditional branch instruction,
has a predecessor block that ends in a conditional branch instruction and has as a destination block the present block, and
has a size that is less than a pipeline size of a target processor for the assembly instructions; and
(d) transforming at least a portion of the number of assembly instructions into conditional execution instructions when the at least one conditional execution optimization should be applied.

12. The method of claim 7, further comprising:
(e) re-determining whether the at least one conditional execution optimization should be applied based on at least one of the number of transform blocks and the control flow, when at least one of the transform block data structure and control flow data structure are changed after steps (c) and (d) have been applied to all of the number of transform blocks,
(f) transforming at least a portion of the number of assembly instructions into conditional execution instructions when the at least one conditional execution optimization should be applied based on the re-determination.

13. An article of manufacture comprising a computer readable medium having stored thereon instructions adapted to be executed by a processor, the instructions which, when executed, define a method comprising the steps of:
determining a number of blocks associated with a number of assembly instructions, and storing indications of the number of blocks in a transform block data structure;
determining a control flow associated with the number of blocks, and storing indications of the control flow in the control flow data structure;
determining whether at least one conditional execution optimization should be applied based on at least one of the number of blocks and the control flow;
transforming at least a portion of the number of assembly instructions into conditional execution instructions when the at least one conditional execution optimization should be applied; and
when determining whether the at least one conditional execution optimization should be applied, determining whether a present block
ends with a conditional branch instruction,
has a destination block of the conditional branch instruction that does not have more than one predecessor block and ends with an unconditional branch, and
has a size that is less than a pipeline size of a target processor for the assembly instructions,
in which case the at least one conditional execution optimization should be applied.

14. The system of claim 4, further comprising:
a compiler processing facility, configured to generate the number of assembly instructions based on a number of source code instructions.

15. The system of claim 4, wherein the transform block data structure and the control flow data structure are part of a single block data structure.

16. The system of claim 5, further comprising:
a compiler processing facility, configured to generate the number of assembly instructions based on a number of source code instructions.

17. The system of claim 5, wherein the transform block data structure and the control flow data structure are part of a single block data structure.

18. An article of manufacture comprising a computer readable medium having stored thereon instructions adapted to be executed by a processor, the instructions which, when executed, define a method comprising the steps of:
determining a number of blocks associated with a number of assembly instructions, and storing indications of the number of blocks in a transform block data structure;

determining a control flow associated with the number of blocks, and storing indications of the control flow in the control flow data structure;

determining whether at least one conditional execution optimization should be applied based on at least one of the number of blocks and the control flow;

transforming at least a portion of the number of assembly instructions into conditional execution instructions when the at least one conditional execution optimization should be applied; and when determining whether the at least one conditional execution optimization should be applied, determining whether a present block ends with a conditional branch instruction, has a destination block not of the conditional branch instruction that does not have more than one predecessor block, does not end with a conditional branch, and has as its own destination block a destination block of the conditional branch instruction, and has a size that is less than a pipeline size of a target processor for the assembly instructions, in which case the at least one conditional execution optimization should be applied.

19. An article of manufacture comprising a computer readable medium having stored thereon instructions adapted to be executed by a processor, the instructions which, when executed, define a method comprising the steps of:

determining a number of blocks associated with a number of assembly instructions, and storing indications of the number of blocks in a transform block data structure;

determining a control flow associated with the number of blocks, and storing indications of the control flow in the control flow data structure;

determining whether at least one conditional execution optimization should be applied based on at least one of the number of blocks and the control flow;

transforming at least a portion of the number of assembly instructions into conditional execution instructions when the at least one conditional execution optimization should be applied; and when determining whether the at least one conditional execution optimization should be applied, determining whether a present block does not end with a conditional branch instruction, has a predecessor block that ends in a condition branch instruction and has a destination block the present block, and has a size that is less than a pipeline size of a target processor for the assembly instructions, in which case the at least one conditional execution optimization should be applied.

\* \* \* \* \*